United States Patent [19]

Kataoka et al.

[11] Patent Number: 5,285,123
[45] Date of Patent: Feb. 8, 1994

[54] TURBO-GENERATOR

[75] Inventors: Hajime Kataoka, Ibaraki; Kazuo Haga, Kamakura, both of Japan

[73] Assignee: Doryokuro Kakunenryo Kaihatsu Jigyodan, Tokyo, Japan

[21] Appl. No.: 43,213

[22] Filed: Apr. 5, 1993

[30] Foreign Application Priority Data

Apr. 6, 1992 [JP] Japan .................. 4-113022

[51] Int. Cl.⁵ .................. H02K 5/124; H02K 7/09; H02K 9/10; H02K 7/18
[52] U.S. Cl. .................. 310/88; 310/55; 310/90.5; 290/52
[58] Field of Search .................. 310/52, 53, 55, 57, 310/64, 88, 85, 905, 90; 290/52; 60/39.03, 39.83

[56] References Cited

U.S. PATENT DOCUMENTS

| | | | |
|---|---|---|---|
| 1,960,744 | 5/1934 | Ljungström | 290/52 |
| 2,707,244 | 4/1955 | Kilgore et al. | 310/57 |
| 3,210,553 | 10/1965 | Cummings | 290/52 |
| 4,002,023 | 1/1977 | Hartmann | 290/52 |
| 4,069,673 | 1/1978 | Lapeyre | 290/52 |
| 4,295,067 | 10/1981 | Binder et al. | 310/57 |
| 4,392,063 | 7/1983 | Lindquist | 290/52 |
| 4,638,173 | 1/1987 | Milton | 290/52 |
| 5,021,697 | 6/1991 | Kralick | 310/90.5 |
| 5,083,040 | 1/1992 | Whitford et al. | 290/52 |
| 5,126,612 | 6/1992 | Girault | 310/90.5 |

FOREIGN PATENT DOCUMENTS

| | | | |
|---|---|---|---|
| 2158456 | 5/1973 | Fed. Rep. of Germany | 310/53 |
| 2310010 | 11/1976 | France | 310/57 |
| 2-299439 | 12/1990 | Japan . | |
| 1575270 | 6/1990 | U.S.S.R. | 310/90.5 |

*Primary Examiner*—Steven L. Stephan
*Assistant Examiner*—C. LaBalle
*Attorney, Agent, or Firm*—Wenderoth, Lind & Ponack

[57] ABSTRACT

A turbo-generator has a tapering cooling part positioned between a vapor turbine part and a generator part, and casings of these parts are combined together to form a sealed single-boundary structure. A turbine shaft in the vapor turbine part, a rotary shaft in the cooling part and a generator shaft in the generator part are combined unitarily and are supported by bearing parts in such a way that the unitary shaft does not pass from the boundary structure. The tapering cooling part has a smaller diameter at the side of the generator part, and the inner circumferential surface of the cooling part forms a labyrinth structure to separate the atmospheres of the vapor turbine part and the generator part.

12 Claims, 6 Drawing Sheets

TURBO-GENERATOR

BACKGROUND OF THE INVENTION

The present invention relates to a turbo-generator in which a vapor turbine part and a generator part are formed unitarily so that a casing therefor does not have any rotary shaft-passed part, whereby leakage of a turbine working fluid is prevented. This turbo-generator has a maintenance-free feature, and can be utilized not only in a gravitational field but also in space (gravity-free field).

In a conventional generating system using a vapor turbine, a vapor turbine part and a generator part are formed independently of each other and are separated definitely. A rotational force is transmitted mechanically between the turbine part and the generator part via their rotary shafts passed through their respective casings and connected together. Accordingly, slidable components, such as bearing and sealing mechanisms are provided in the vapor turbine part and the generator part, so that the generating system requires periodic maintenance. Therefore, the reliability of this generating system with respect to its continuous long-term use is low. Especially, the part of the generating system which is on the vapor turbine part side has a problem that vapor, a turbine working fluid, leaks to the outside through the bearings and sealing mechanisms, and this causes an absolute quantity of the working fluid in the system to decrease. In the case where the turbine working fluid consists of a radioactive fluid, the diffusion thereof has a very serious influence upon the environment.

A turbo-generator in which a vapor turbine part and a generator part are formed unitarily with a rotary body driven in a floated non-supported state has been proposed as a turbo-generator capable of solving these problems (refer to Japanese Patent Laid-Open No. 299439/1990). In this apparatus, a plurality of cup-shaped pressure-receiving buckets are provided at a circumferentially peripheral portion of a disc-like rotary body, and the rotary body is driven by the working fluid jetted against these buckets in a balanced state of the rotary body. Conductors or permanent magnets are fitted to the rotary body, and stationary permanent magnets or stationary conductors are so arranged as to face the conductors or permanent magnets fitted to the rotary body, whereby electric power is generated.

This prior art turbo-generator has succeeded in achieving the reduction of dimensions and weights thereof and obtaining a leakage-free and maintenance-free structure owing to the unification of the turbine and generator elements and to the no-bearing structure, and constitutes epochal techniques in these respects.

However, this prior art turbo-generator has many problems to be solved, which will be described below, before putting it to practical use. The turbine element has a cup-shaped pressure-receiving bucket structure, in which the rotating pressure-receiving buckets can be set only in a single stage, so that the turbine efficiency is low. In the generator element, a coil is wound only partially on a region in which electric power is generated, and a casing member is provided in a magnetic circuit. Therefore, it is difficult to raise the generating efficiency to a higher level. The stability of the rotary body is determined by only the interaction between the jetted vapor and cup-shaped pressure-receiving buckets, and so it is difficult to increase the stability. The temperature of the turbine working fluid is restricted by the acceptable temperature of the permanent magnets stably used in the generator part for a long period of time, which is currently around 200° C. Thus, it is impossible at present to increase the working fluid temperature above the mentioned level.

Both the turbine element of a cup-shaped pressure-receiving bucket structure and the generator element of a partially coil wound structure provided with a casing-interposed part are wholly novel structures. In order to improve the generating efficiency it becomes necessary to newly develop the whole system because there is no experience in the designing and manufacturing such elements. Consequently, the time and money required for the development of the prior art turbo-generator described above necessarily becomes enormous.

SUMMARY OF THE INVENTION

An object of the present invention is to provide a turbo-generator capable of being designed and manufactured easily by utlizing existing established techniques for manufacturing a turbine part and a generator part, capable of preventing the leakage of a fluid and using maintenance-free bearings, capable of reducing the dimensions and weight of the apparatus owing to the improved generating efficiency, and capable of using a high-temperature turbine working fluid.

According to a turbo-generator of the present invention, a vapor turbine part and a generator part are so arranged so that a tapering cooling part is positioned therebetween, and casings of the vapor turbine part, the cooling part and the generator part are combined together to form a sealed single-boundary structure. A turbine shaft in the vapor turbine part, a rotary shaft in the cooling part and a generator shaft in the generator part are combined unitarily and supported by bearing parts at the ends of the boundary structure in such a way that the unitary shaft does not pass out of the boundary structure. The tapering cooling part has a smaller diameter at one end thereof at side of the generator part. The inner circumferential surface of the casing of the cooling part is provided with a plurality of annular weirs; the outer circumferential surface of the rotary shaft in the cooling part is provided with a plurality of annular projections, the annular projections being positioned among the weirs so as to form a labyrinth structure. It is preferable in this turbo-generator that the cooling part and the generator part be arranged symmetrically with respect to the vapor turbine part.

In a preferable structure of this turbo-generator, a magnetic bearing is used for the bearing part, and a permanent magnet rotor is mounted on the generator shaft. In order to seal the working fluid, a sealing gas is introduced into the interior of the casing of the generator part. In order to cool the cooling part and the generator part, heat pipes can be used. Potassium vapor is preferable as a working fluid for the vapor turbine part.

The tapering cooling part positioned between the vapor turbine part and the generator part is adapted to condense the working fluid (vapor) in the vapor turbine part owing to the effect of the labyrinth structure, in order to prevent the working fluid from entering the generator part. Namely, a condensed liquid is collected in the recesses between the weirs formed over the whole circumference of the casing of the cooling part, due to the centrifugal force of the rotary shaft in the cooling part and the annular projections. A sealing gas is introduced, if necessary, into the generator part so as to balance the vapor pressure with the back pressure of the sealing gas. This enables the turbine shaft, the rotary shaft in the cooling part and the generator shaft to be housed in a single boundary structure. Owing to this structure and the non-shaft-passed bearing support structure, leakage of the internal turbine-working fluid to the outside can be prevented. Owing to the provision of the cooling part, a high-temperature working fluid can be used only in the vapor turbine part and a permanent magnet rotor can be used in the generator part.

When the cooling part and the generator part are disposed symmetrically on both sides of the steam turbine part, component forces (thrust forces) produced in the axial direction can be offset, and the interior rotating elements can be supported in a completely non-contacting state with a high stability by using a magnetic bearing capable of absorbing minute unstable thrust forces only.

PREFERRED EMBODIMENTS OF THE INVENTION

Figure 1:
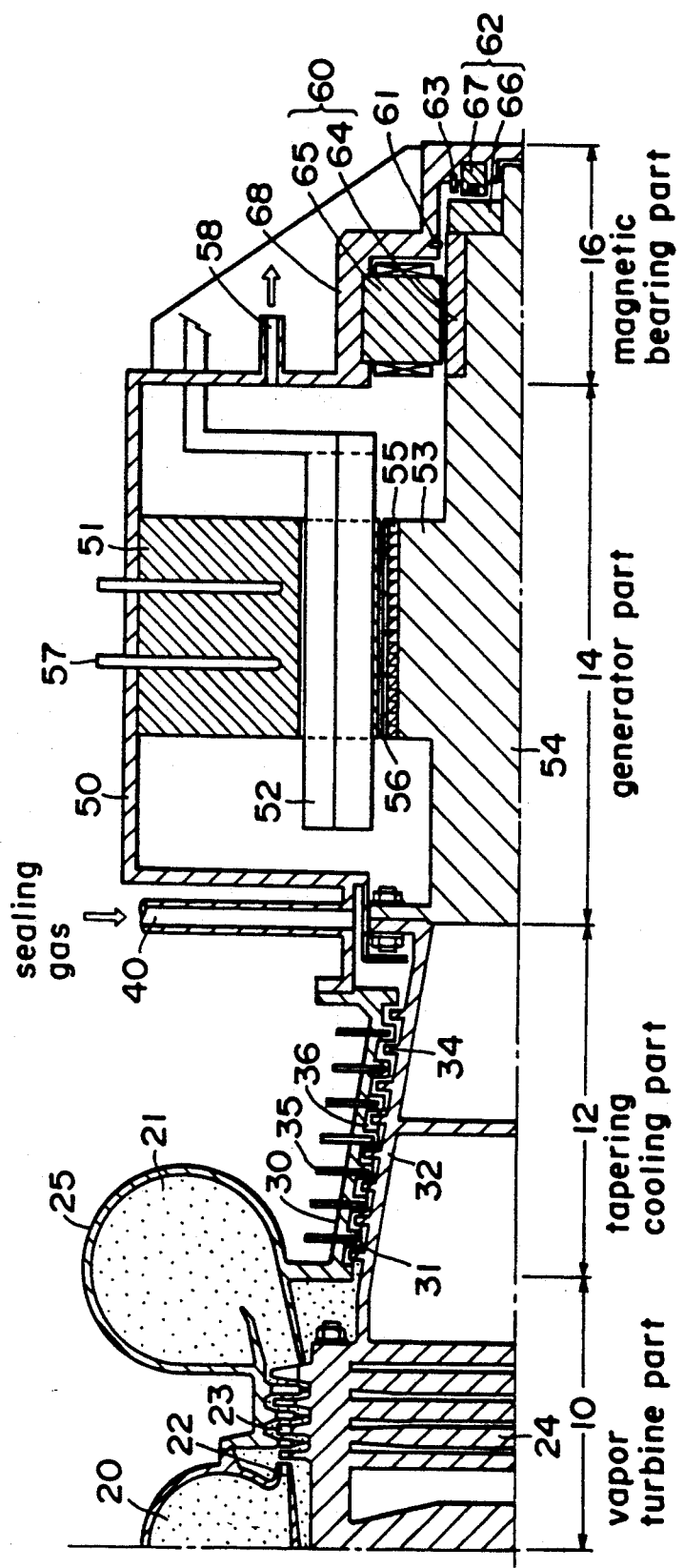
FIG. 1 is a partially-sectional view showing an embodiment of the turbo-generator according to the present invention.
Figure 2:
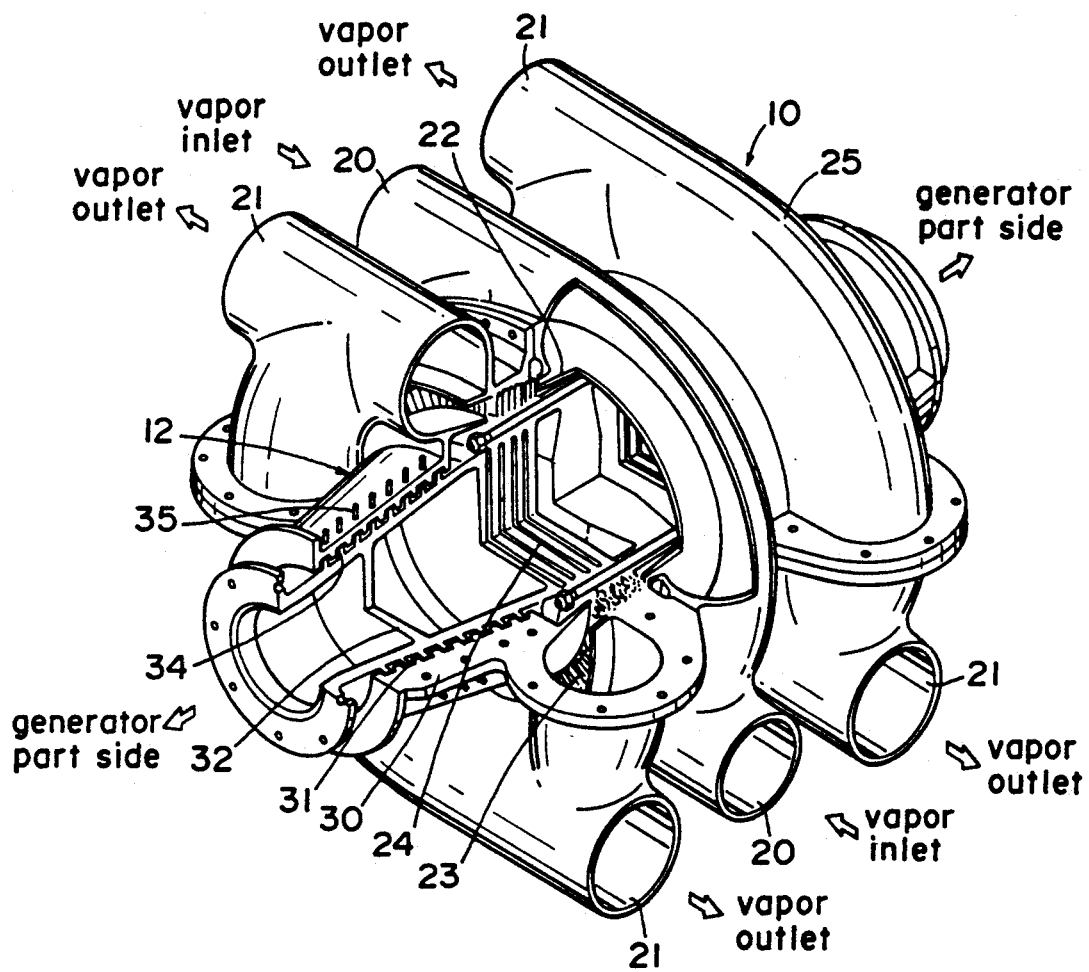
FIG. 2 is a partically cutaway view in perspective of the vapor turbine part and the cooling part shown in FIG. 1.
Figure 3:
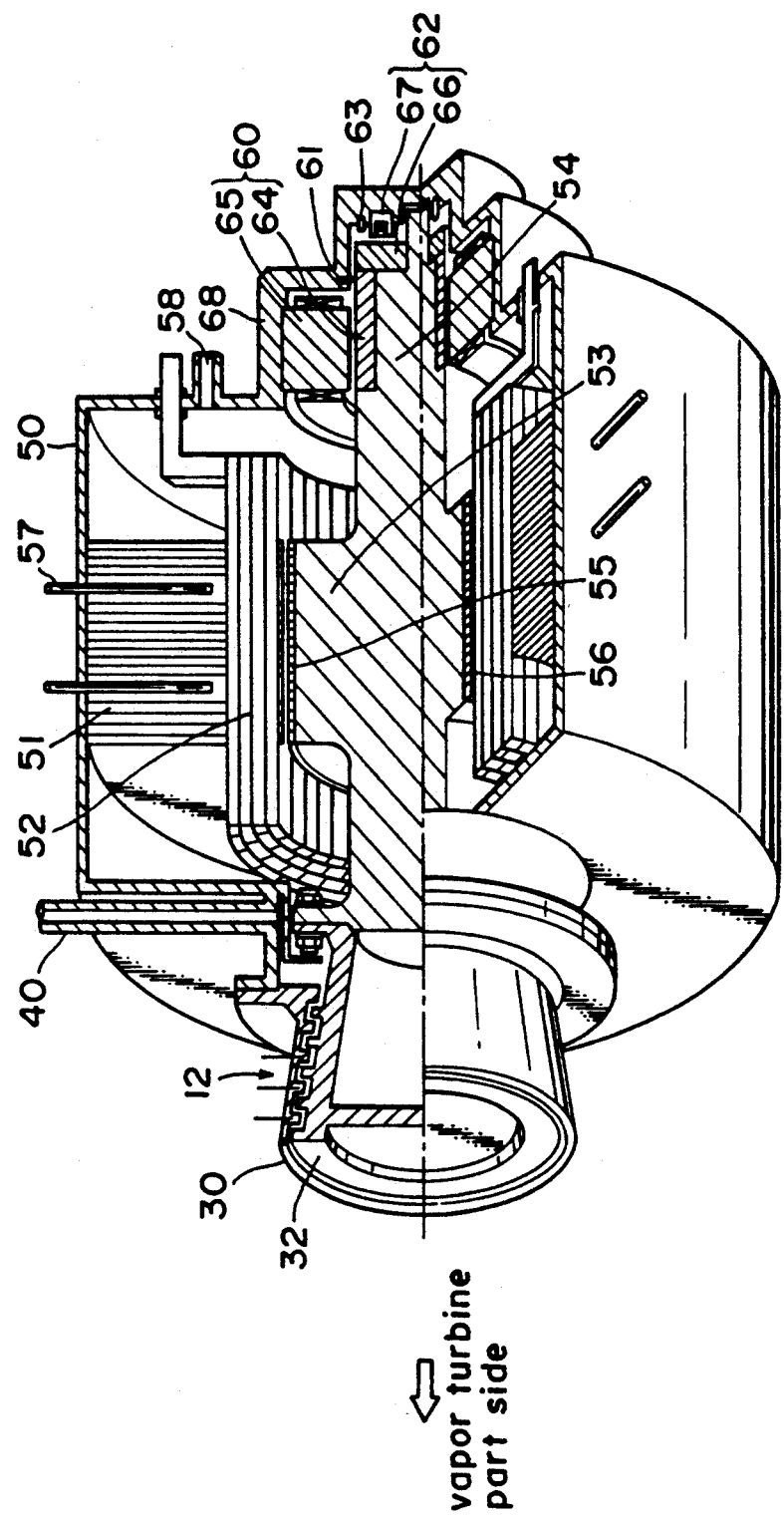
FIG. 3 is a partially cutaway view in perspective of the cooling part and the generator part shown in FIG. 1.

FIG. 1 is a quarter sectional view of an embodiment of the turbo-generator according to the present invention. The embodiment has a substantially rotationally symmetric structure with respect to the lateral axis X, and a laterally symmetric structure with respect to the longitudinal axis Y. This turbo-generator consists mainly of a vapor turbine having part 10, a tapering cooling section having part 12 and a generator having part 14 in the figure, and the vapor turbine is disposed at the center with the other parts disposed on both sides thereof in the mentioned order. The construction of the vapor turbine and the cooling section is shown in FIG. 2, and that of the cooling part 12 and the generator part 14 in FIG. 3. The casings for these parts are integrated by bolts or welding to form a sealed single-boundary structure, and the internal rotating elements are housed completely in this single-boundary structure.

This apparatus is so designed that vapor of metal potassium is used as a working fluid for the vapor turbine, and the estimated conditions of the vapor are 1040° C., 3.8 atm. at the inlet and 656° C., 0.35 atm. at the outlet and the estimated lifetimne is 10 years.

The vapor turbine part 10 is a part for converting the thermal energy of the turbine working fluid (vapor) into a rotary motion, and has a construction substantially similar to that of a conventional vapor turbine. It mainly comprises a vapor inlet annular pipe 20, a vapor outlet annular pipe 21, multi-stage nozzles 22, multi-stage moving blades 23, a turbine shaft 24 supporting the moving blades 23 and adapted to transmit a rotary motion to the generator, and a turbine casing 25 generally forming a vapor boundary structure. The vapor jetted from the nozzles 22 on the stationary side impinges upon the moving blades 23 to generate a rotational force, which turns the turbine shaft 24. The nozzles 22 and moving blades 23 do not necessarily consist of multi-stage nozzles and multi-stage moving blades as shown in the drawings, and even when they consist of single-stage nozzles and single-stage moving blades, they can function identically.

The tapering cooling part 12 is interposed between the vapor turbine part 10 and the generator part 14 in such a way that the smaller-diameter end thereof is positioned on the generator part 14 side. The inner circumferential surface of a casing 30 of the cooling part 12 is provided with a plurality of annular slotted weirs 31; the outer circumferential surface of a rotary shaft 32 of the cooling part which is connected to the turbine shaft 24 is provided with a plurality of annular projections 34, these annular projections being fitted into gaps between the weirs 31 in a non-contacting state to form a labyrinth flow passage structure. Heat pipes 35 are buried in the weirs 31 and connected to a heat radiator (not shown) to cool the entire tapering cooling part 12 so that the cooling part 12 may have a moderate temperature distribution of 656°-200° C. Accordingly, when the potassium vapor flows through the labyrinth flow passage toward the generator part, the temperature of the potassium vapor decreases in the labyrinth structure. Consequently, the potassium vapor is not diffused but condensed immediately, and the condensate droplets are collected in the recesses in the weirs 31 owing to the centrifugal force of the rotary shaft 32 in the cooling part and of the annular projections 34 to form a vapor condensate dam 36. A sealing gas is introduced from a sealing gas inlet pipe 40 on the generator part side to apply a back pressure of gas so that the sealing gas pressure may be balanced with the vapor pressure. Consequently, the vapor condenstate dam 36 tending to grow in the weirs 31 close to the generator part 14 is pushed back to and balanced in an intermediate part of the cooling part 12. Even when the condensation of the vapor progresses excessively for some reason, and the condensate flows out from the vapor condensate dam 36, the condensate flows out from the lower weirs near the vapor turbine part 10 because of the tapered shape of the cooling part. The potassium liquid thus flowing out restores its temperature to become vapor again. Namely, the condensation and evaporation of potassium in the vapor condensate dam 36 become balanced or equilibrated. Thus, the entry of potassium vapor into the generator part 14 is prevented.

The generator part 14 as a stationary side structure has a gas-tight cylindrical generator casing 50, an annular armature core 51 for passing a magnetic flux therethrough, and an armature coil 52 so buried in the armature core 51 as to cross a magnetic flux. A rotary side structure comprises a generator shaft 54 connected to the rotary shaft 32 in the cooling part and serving also as a permanent magnet yoke 53 for passing a magnetic flux therethrough, permanent magnets 55 so arranged cylindrically on the surface of the generator shaft 54 as to be opposed to the armature coil 52, and a permanent magnet protecting cylinder 56 holding the permanent magnets 55 so that the centrifugal force of the generator shaft 54 does not cause the permanent magnets 55 to fly. Heat pipes 57 are buried in the armature core 51 so as to remove the heat generated due to generating loss, prevent the heat transfer and maintain the temperture at a level below the acceptable temperature of the permanent magnets 55. A reference numeral 58 denotes a sealing gas outlet pipe.

Figure 4:
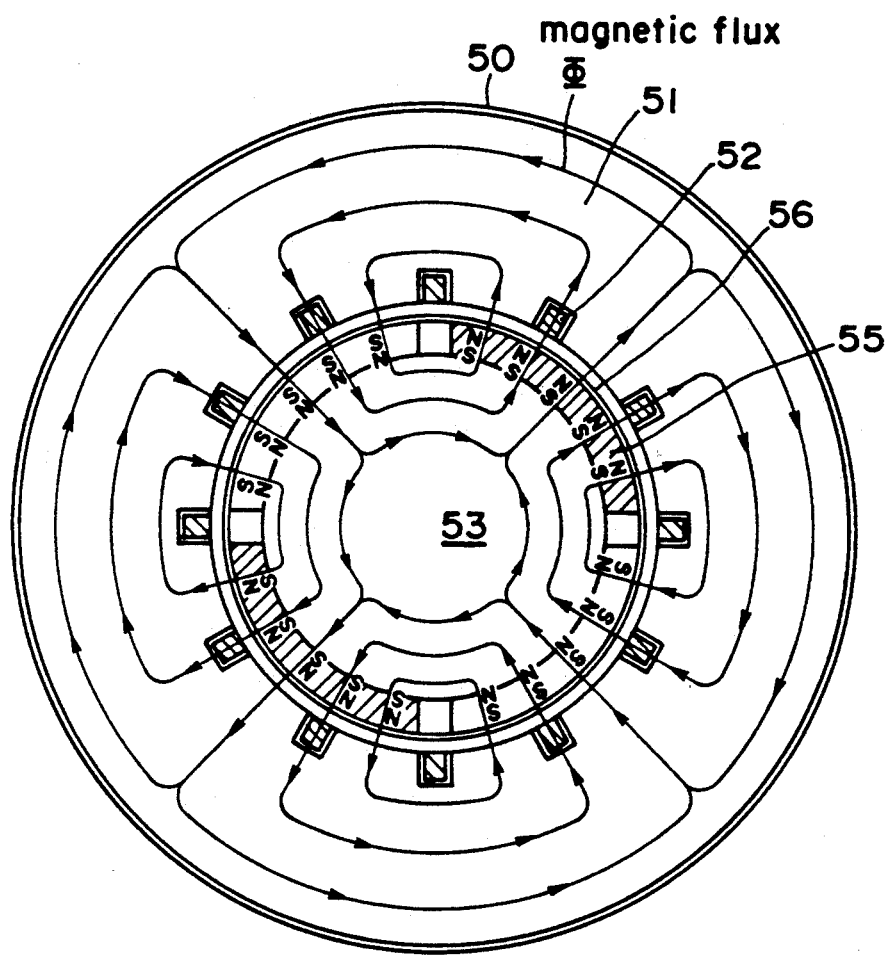
FIG. 4 is an illustration of a magnetic circuit of the generator part shown in FIG. 1.

A magnetic circuit in a sectional side elevation in the generator part 14 is shown in FIG. 4, with reference to which a generating mechanism will be described. A magnetic flux $\theta$ produced in the permanent magnets 55 flows across the armature coils 52 and through the permanent magnet protecting cylinder 56, sealing gas gap, armature core 51 and permanent magnet yoke 53 to form a magnetic circuit. When the generator shaft 54 is rotated, the permanent magnets 55 are also rotated, so that the magnetic field formed is also rotated. Consequently, the magnetic flux crosses the stationary armature coils 52 in alternately different directions and an alternating current occurs in each armature coil 52. AC power is thus generated.

A unitary rotating shaft (consisting of the turbine shaft 24, the rotary shaft 32 in the cooling part and the generator shaft 54 which are combined unitarily) is supported rotatably in a non-contacting state on the magnetic bearing parts 16 at both ends of the turbo-generator. Each magnetic bearing part 16 consists of a magnetic radial bearing 60, a radial sensor 61, a magnetic thrust bearing 62, and a thrust sensor 63. The magnetic radial bearing 60 is adapted to restrict the radial displacement of the unitary shaft, and consists of a combination of a permanent magnet 64 fixed to the unitary shaft, and an electromagnet 65 fixed to a bearing casing 68. The unitary shaft is supported owing to a magnetic repulsive force (or attractive force) produced between the permanent magnet 64 and the electromagnet 65, without contacting the electromagnet 65 on the stationary side. The radial sensor 61 is used to monitor the distance between itself and the unitary shaft and to adjust the magnetic force of the electromagnet 65 in accordance with this distance. The magnetic thrust bearing 62 is adapted to restrict the axial displacement of the unitary shaft and consists of a combination of a permanent magnet 66 fixed to the unitary shaft and an electromagnet 67 fixed to the casing 68. The magnetic thrust bearing 62 has a function of supporting the unitary shaft in a non-contacting state owing to the magnetic repulsive force (or attractive force) of the permanent magnet 66 and the electromagnet 67, just like the magnetic radial bearing 60. The functions of the thrust sensor 63 are basically identical with those of the radial sensor 61. This magnetic bearing part 16 is surrounded by the bearing casing 68.

The turbo-generator as a whole is composed of parts arranged symmetrically in the lateral direcion with respect to the longitudinal axis Y in FIG. 1, whereby a thrust force is offset, so that the load on the magnetic thrust bearing 62 decreases to prevent vibration. Furthermore, in a gravity-free state, a rotary force reactively produced in a space vehicle in which this turbo-generator is mounted can also be offset owing to this construction.

The necessity of the cooling part 12 which is the most important part of the present invention will now be supplementarily described. If the inner space of the generator part 14 is provided simply within the same boundary structure as that of the vapor turbine portion 10, the interior of the generator part 14 naturally is filled with a potassium atmosphere and has to withstand a temperature of 656° C. In existing generators, a coil is wound around an inner rotating element and slidably connected to an electric wire led in from the outside via a brush. If the electrically conductive potassium vapor or liquid droplets are deposited to such an extent that the electrodes of the brush are short-circuited, an electric generating circuit is not formed, so that the apparatus ceases functioning as a generator. Therefore, the atmosphere in the vapor turbine part 10 and that in the generator part 14 have to be separated from each other. Since the inner rotating element in the generator part 14 requires not a coil but a moving magnetic field, it is preferable that a permanent magnet 55 be provided as a moving magnetic field generating means. However, the magnetic characteristics of a permanent magnet depend upon temperature, and vary with time. Therefore, in view of the design lifetime of the permanent magnet, a practically acceptable temperature thereof is currently 200° C. When the generator part 14 is so cooled that the temperature thereof is 200° C., the potassium vapor having a quality of about 1 at 656° C., 0.35 atm. is condensed, and the interior of the generator part 14 is filled with liquid potassium. This causes the short-circuiting of the armature coil 52 in the stationary side of the generator part 14 and an increase in the rotary frictional resistance thereof in a liquid, and, therefore, the cooling of the generator part 14 in such a manner must be avoided. Accordingly, it is necessary in this case as well that the atmosphere in the vapor turbine part 10 and the atmoshpere in the generator part 14 be separated from each other. The cooling part 12 is a part required to materialize this separation.

The reason why the cooling part 12 is tapered resides in the necessity of preventing the collected fluid from flowing into the generator part 14. The condensed working fluid flies aways due to the centrifugal force of the rotary shaft 32 in the cooling part 12 and annular projections 34 and gathers in the bottoms of the gaps (recesses) between the weirs 31. If the heights of the weirs measured from the inner surface of the casing 30 for the cooling part 12 are set equal, the fluid gathered continuously flows toward the vapor turbine part 10 since the depth of the liquid in the divergent part of the cooling part 12 is smaller. Therefore, the tapering shape referred to in the present invention means that the labyrinth passage is tapered, and includes not only a case where the casing itself is tapered with weirs of the same height provided but also a case where the casing is cylindrical with weirs of gradually varying height (the height is smaller toward the vapor turbine part 10) provided. The direction in which the labyrinth passage diverges has to be unchanged (smaller diameter on the generator part side) for the reasons given above, and the labyrinth passage cannot be directed reversely.

The potassium evaporates from the liquid surface of potassium in the vapor condensate dam 36 which is close to the generator part 14 into the sealing gas but even when this potassium is diffused into the generator part 14, there is no possibility that it is condensed into liquid droplets. The temperature of the surface of the vapor condensate dam 36 which is close to the generator part 14 and that of the interior of the generator part are equal. Accordingly, the evapration of potassium occurs until the pressure in the generator part 14 has reached the saturated vapor pressure of potassium at the temperature of the interior of the generator part but, when the saturated vapor pressure has been attained, the vapor pressure becomes balanced and evaporation stops. Incidentally, the saturated vapor pressure of potassium at 200° C. is about $1.5 \times 10^5$ atm, and the absolute amount of potassium contained therein is very small. Since the temperature in the generator part is uniform, condensation does not occur. If there is a fear of condensation, the temperature in the generator part 14 may be set somewhat higher than that of the vapor condensate dam 36 in the position close to the generator part.

When the turbo-generator is started or stopped, the unitary shaft is stopped and the centrifugal force is not produced. Consequently, an annular vapor condensate dam 36 is not formed, and the separation of two atmospheres in the vapor turbine part 10 and the generator part 14 cannot be carried out. The methods of solving this problem differ depending upon the mode of practical use of the turbo-generator. Concretely speaking, there will be a case where the turbo-generator is used in a horizontal state in a gravitational field (in the condition shown in FIG. 1), a case where it is used in a vertical state in a gravitational field, and a case where it is used in a gravity-free state. In any of these cases, there is a possibility that vapor is diffused toward the generator part 14 and condensed until the turbo-generator has reached the rated operation. Accordingly, in a mode of use of the turbo-generator in a gravitational field, a drain pipe (not shown) is provided at the lowermost part of the generator part 14, and condensate may be discharged after the turbo-generator has reached the rated operaton. In a gravity-free state, the sealing gas outlet pipe is opened while the equilibrium of the sealing gas pressure with the vapor pressure is maintained, and the condensate droplets may be recovered by entraining them in a waste gas. In any of these cases, an injection pipe (not shown) may be joined to the weir part, and, when the rotary shaft 32 starts to rotate, such a small quantity of liquid potassium that serves to form a dam 36 may be forcedly injected.

The sealing gas inlet pipe 40 and sealing gas outlet pipe 58 are provided with valves (not shown) so that the gas-tightness of the boundary structure can be secured. The sealing gas inlet and outlet pipes 40, 58 are used to supply and discharge a sealing gas thereto and therefrom so that the sealing gas pressure is balanced with the vapor pressure when the turbo-generator is started and stopped. These valves can be basically closed after the balancing pressure has been established in an initial stage of the rated operation. Therefore, the gas-tightness of the boundary structure is not broken, and the constant leakage of a turbine working fluid, like in conventional shaft-passed type turbines, does not occur.

The vapor turbine working fluid preferably consists of a fluid which enables the vapor temperature at the inlet of the turbine to be set high. The reason is that such a fluid enables the thermal efficiency to be improved and a generating system of reduced dimensions and weight to be formed. In the case of turbine generation, high-temperature vapor enters the turbine, turns into low-temperature vapor and flows out from the turbine. The heat difference (enthalpy difference) in the vapor turbine part 10 causes the generator to be rotated to carry out energy conversion. Accordingly, it is obvious that using a working fluid capable of obtaining a large enthalpy difference, and designing the turbo-generator satisfying the conditions for increasing the enthaply difference are expedient. However, regarding the construction of a generating system, limitations are placed thereon, and the waste heat must also be considered.

The reasons why potassium vapor is preferably used as follows.

(1) In view of the thermal efficiency of the system, using a high-temperature working fluid is advantageous. The theoretical thermal efficiency $\eta$ of the system is $\eta = 1 - T_L/T_H$ (wherein $T_L$ represents the temperature of a low-temperature heat source; and $T_H$ the temperature of a high-temperature heat source). If the temperature of a low-temperature heat source is constant, a high temperature of the vaper inlet of a turbine causes the thermal efficiency to be improved. Since the melting point and boiling point of potassium at 1 atm. are 63.2° C. and 757° C., respectively, high-temperature vapor thereof can be produced even if the pressure thereof is not increased greatly. When potassium vapor is used, the generating system can be so designed that the conditions for the turbine inlet, 1040° C. and 3.8 atm. and the conditions for the turbine outlet, 656° C. and 0.35 atm. (quality of vapor of 0.9) are satisfied.

(2) Concerning the relation between the turbine and the working fluid, the requirements for the high-temperature strength of the materials of the turbine and the corrosion resistance thereof to potassium can be satisfied even if the current industrial techniques are applied.

(3) The generating system can be so designed that the temperature of vapor at the turbine outlet is about 656° C. This enables a heat disposing system of a turbo-generator for space use to be formed in a rational scale.

(4) When the turbo-generator is used on the ground, a Rankine cycle generating system of the same construction, in which, for example, water as a working fluid is used, can be added in the stage subsequent to a heat exchanger as a heat removal system (2-stage Rankine cycle), and the efficiency of converting heat energy into electric energy can be improved.

A working fluid required to be a substance capable of being changed into a gas phase and a liquid phase. More preferably, the working fluid consists of a substance having a large enthalpy difference when the temperature or pressure varies, or a substance which does not corrode machines and tools, such as a turbine and pipes. When the working fluid is a corrosive substance, materials capable of resisting the corrosive fluid must be available. In view of these facts, potassium is preferably used as mentioned above, and, besides potassium, the following substances can also be used. They include substances used in a low temperature range, such as water and Freon. They also include alcohol and ammonia, and special fluids, such as an organic material, molten salt, mercury, sodium and lithium.

The permanent magnets provided in the generator part 14 can also be in a disc type arrangement in addition to the above-described cylindrical arrangement. An example of a disc type arrangement is shown schematically in FIGS. 5 and 6. The stationary side structure consists of gas-tight cylindrical generator casing 70, an annular armature core 71 for passing a magnetic flux therethrough, and an armature coil 72 so buried in the armature core 71 as to cross the magnetic flux. The rotary side structure consists of a permanent magnet yoke 73 for passing a magnetic flux therethrough, a generator shaft 74 for supporting the yoke, permanent magnets 75 having a disc shape and so provided on the outer surface of the generator shaft as to face the armature coil 72, and permanent magnet protecting plates 76. A magnetic bearing part may be formed in the same manner as that of the above-described embodiment, and the same reference numerals are therefore used to designate the corresponding parts.

Figure 5:
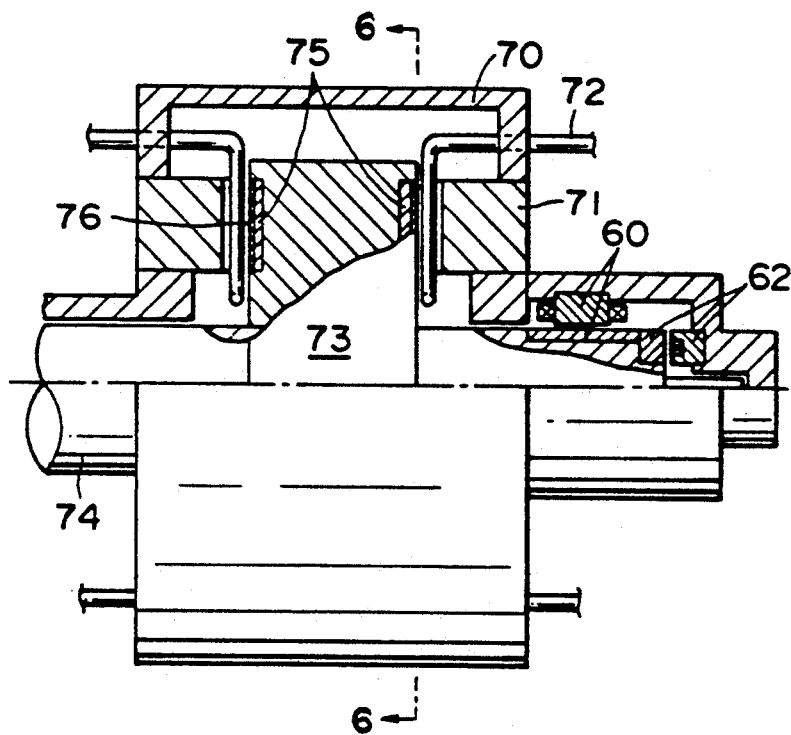
FIG. 5 is a construction diagram of another embodiment of the generator part.
Figure 6:
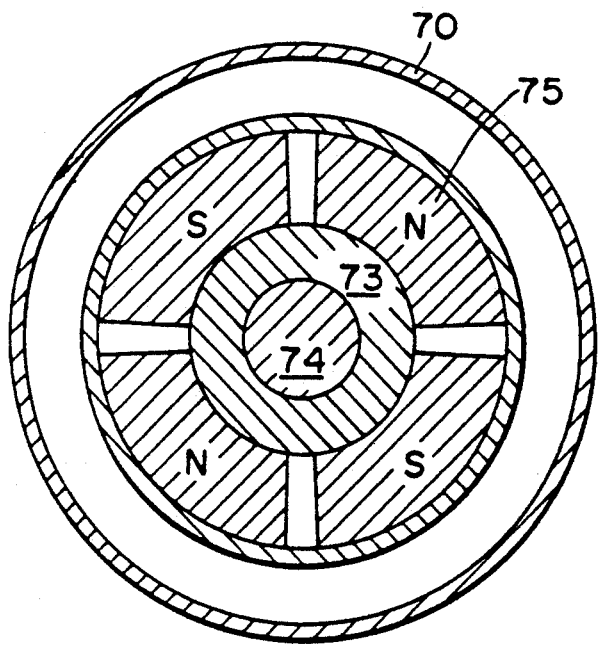
FIG. 6 is a sectional view taken along the line 6—6 in FIG. 5.
Figure 7:
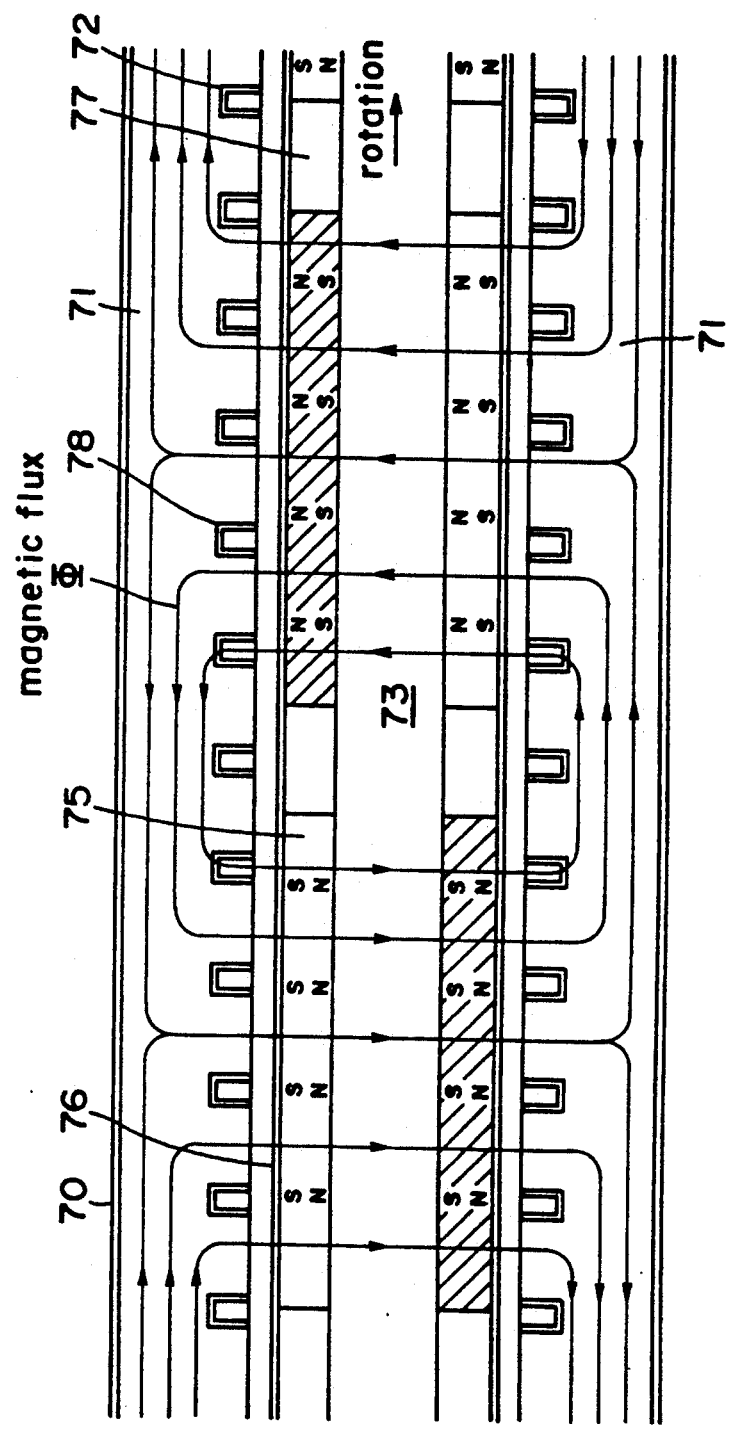
FIG. 7 is an illustration of a magnetic circuit of the generator part shown in FIG. 5.

The magnetic circuit of the embodiment of FIGS. 5 and 6 is shown in FIG. 7 which is a development elevation of the construction of this embodiment, and the corresponding parts are designed by the same reference numerals as in FIGS. 5 and 6. A reference numeral 77 denotes a pole neutral zone, 78 slots (grooves), and reference symbol $\theta$ a magnetic flux. Since the generating mechanism is substantially identical with that of a turbo-generator in which the permanent magnets are cylindrically arranged, the description thereof is omitted.

As being understood from the foregoing, the present invention is capable of forming a vapor turbine part and a generator part unitarily so as to have a common gastight boundary structure, by providing a tapering cooling part between the turbine part and the generator part. This enables the turbo-generator to be minimized. Since a through shaft is not provided, the leakage of a working fluid can be prevented, and a turbine working fluid having a high temperature of about 1000° C. can be used, so that the turbine efficiency is improved. Also in the present invention, the existing established techniques can be applied to the vapor turbine part and the generator part. Therefore, the designing and manufacturing of the turbo-generator can be simplified, and the efficiencies of both the vapor turbine part and the generator part can be improved to high levels. Moreover, by using a magnetic bearing, the unitary rotating shaft can be supported positively and very stably, and, owing to these features as well as the working fluid leakage preventing functions, a maintenance-free turbo-generator can be practically obtained.

What is claimed is:

1. A turbo-generator comprising: a vapor turbine; a generator; a tapering cooling section interposed between said vapor turbine and said generator; said vapor turbine, said cooling section and said generator having casings integrated together to form a sealed single-boundary structure; said vapor turbine also having a turbine shaft, said cooling section also having a rotary shaft and said generator also having a generator shaft, said shafts being integral; bearing parts at ends of said boundary structure and supporting the integral shafts of said vapor turbine, said generator and said cooling section in such a way that the integral shafts do not pass from said single-boundary structure; said tapering cooling section having a smaller diameter at a part thereof adjacent said generator than at a part thereof adjacent said vapor turbine; said cooling section having a plurality of annular weirs at the inner circumferential surface of said casing thereof; and said rotary shaft of said cooling section having a plurality of annular projections at the outer circumferential surface thereof, said annular projections being positioned among said weirs so as to form a labyrinth structure therewith.

2. A turbo-generator according to claim 1, wherein said cooling section and said generator each have respective parts provided symmetrically on both sides of said vapor turbine.

3. A turbo-generator according to claim 1, and further comprising means for introducing a sealing gas into the interior of said casing of said generator.

4. A turbo-generator according to claim 1, wherein said bearing part comprises a magnetic bearing.

5. A turbo-generator according to claim 1, wherein a working fluid for said vapor turbine part is potassium vapor.

6. A turbo-generator according to claim 1, and further comprising heat pipes by which said cooling section and said generator are cooled.

7. A turbo-generator according to claim 1, and further comprising a permanent magnet rotor provided on said generator shaft.

8. A turbo-generator according to claim 1, and further comprising means for introducing a sealing gas into the interior of said casing of said generator.

9. A turbo-generator according to claim 2, wherein said bearing part comprises a magnetic bearing.

10. A turbo-generator according to claim 2, wherein a working fluid for said vapor turbine part is potassium vapor.

11. A turbo-generator according to claim 2, and further comprising heat pipes by which said cooling section and said generator are cooled.

12. A turbo-generator according to claim 2, and further comprising a permanent magnet rotor provided on said generator shaft.

* * * * *